(12) United States Patent
Jin et al.

(10) Patent No.: US 9,590,256 B2
(45) Date of Patent: Mar. 7, 2017

(54) GASKET STRUCTURE OF FUEL CELL SEPARATOR WITH IMPROVED AIR TIGHT SEAL

(75) Inventors: Sang Mun Jin, Seoul (KR); Yoo Chang Yang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 932 days.

(21) Appl. No.: 13/531,839

(22) Filed: Jun. 25, 2012

(65) Prior Publication Data

US 2013/0171543 A1    Jul. 4, 2013

(30) Foreign Application Priority Data

Dec. 29, 2011    (KR) .......................... 10-2011-0145373

(51) Int. Cl.
    *H01M 8/0276*    (2016.01)
    *H01M 8/02*      (2016.01)
    *H01M 8/04*      (2016.01)

(52) U.S. Cl.
    CPC ..... *H01M 8/0276* (2013.01); *H01M 8/04029* (2013.01); *H01M 8/0247* (2013.01); *Y02E 60/50* (2013.01)

(58) Field of Classification Search
    CPC .......................... H01M 8/0273; H01M 8/0276
    See application file for complete search history.

(56) References Cited

U.S. PATENT DOCUMENTS

2009/0197146 A1*  8/2009  Nonogaki et al. .............. 429/34
2011/0033781 A1*  2/2011  Chin et al. .................... 429/510

FOREIGN PATENT DOCUMENTS

| CN | 1612391 A | 5/2005 |
|---|---|---|
| EP | 2348564 A1 | 7/2011 |
| JP | 2005026179 A | 1/2005 |
| JP | 2007-250248 A | 9/2007 |
| JP | 2008-293896 A | 12/2008 |
| KR | 10-2005-0095725 | 9/2005 |
| KR | 10-0777124 | 11/2007 |
| KR | 10-0807976 | 2/2008 |
| KR | 10-2009-0028308 | 3/2009 |
| KR | 10-2011-0013963 | 2/2011 |
| KR | 10-2011-0015924 | 2/2011 |
| KR | 10-2011-0026099 A | 3/2011 |

* cited by examiner

*Primary Examiner* — Maria J Laios
(74) *Attorney, Agent, or Firm* — Mintz Levin Cohn Ferris Glovsky and Popeo, P.C.; Peter F. Corless

(57) ABSTRACT

Disclosed is a gasket structure for a fuel cell separator with an improved air tight seal/sealability. The gasket structure includes first and second main lines and a plurality of sub lines. The first and second main lines are disposed in a horizontal direction in the separator on different lines of a reaction surface and a cooling surface of the separator, respectively. The plurality of sub lines are disposed in a vertical direction of the separator on both surfaces at a uniform interval. Here, the first and second main lines and the plurality of sub lines integrally form a gate for reactance gases and cooling water, and a plurality of vacant spaces are formed to have a uniform size on the first and second main lines.

8 Claims, 7 Drawing Sheets

GASKET STRUCTURE OF FUEL CELL SEPARATOR WITH IMPROVED AIR TIGHT SEAL

CROSS-REFERENCE TO RELATED APPLICATION

This application claims under 35 U.S.C. §119(a) the benefit of Korean Patent Application No. 10-2011-0145373 filed Dec. 29, 2011, the entire contents of which are incorporated herein by reference.

BACKGROUND (a) Technical Field

The present invention relates to a gasket structure of a fuel cell separator with an improved air tight seal. More particularly, it relates to a gasket structure of a fuel cell separator, which can an improve air tight seal of flow channels without occurrence of a gasket burr and facilitate flow of fluid in each flow channel, by forming a vacant space on a gasket formed integrally with the fuel cell separator.

(b) Background Art

Generally, a metal separator manufactured by a method of, for example, stamping a thin metal plate has an advantage of significantly reducing the manufacturing time and cost compared to a graphite separator manufactured by mechanical working or powder molding. In a fuel cell in which a plurality of metal separators are stacked in series, a gasket is disposed between the metal separators, and the gasket may be integrally manufactured on both surfaces of the separator by an injection molding method. In this case, since the fuel cell that has to maintain an air tight seal of reactant gases and cooling fluids, the gasket has to be manufactured to maintain the air tight seal of working fluids.

An exemplary fuel cell separator having a gasket for maintaining an air tight seal has been previously disclosed in Korean Patent Application Publication No. 10-2011-0015924, filed by the present applicant, and is hereby incorporated by reference.

As shown in the above disclosure, a gasket is fuel cell assembly is integrally injection-molded on the separator. Gaskets integrally injected on both surfaces of a separator are continuously connected to form a closed curve. Also, a plurality of injection apertures are formed at all edges of the separator and boundary surfaces between manifolds to allow a gasket injection fluid to pass through. The gasket injection fluid flows from one surface to the other surface of the separator through the injection apertures, integrally injection-molding the gaskets on both surfaces of the separator.

More specifically, the structure of a gasket integrally formed on a reaction surface side and a cooling surface side of a typical separator shown in FIGS. 1A and 1B, respectively, will be described below. A reaction surface 10 of a separator shown in FIG. 1A is a location/area where a fuel cell reaction occurs. Manifolds 20, 22 and 24 serve as passageways for hydrogen, cooling water, and air, and are located at the reaction surface 10. A reaction surface side main line 30a is formed at the side of the reaction surface 10 by injection molding to interrupt movement of reactant gases and cooling fluids. A plurality of sub lines 32a parallelly extend from the main line 30a at a certain interval as shown in FIG. 1A. Hydrogen introduced from the side of the cooling surface 12 (described later) moves to the reaction surface 10 through the hydrogen passageway 40.

Also, a cooling surface 12 of the separator shown in FIG. 1B is a portion for removing reaction heat generated by the chemical reaction. The manifolds 20, 22 and 24 that serve as passageways for hydrogen, cooling water, and air are located at the cooling surface 10. A cooling surface side main line 30b is formed on one side of the reaction surface 10 by injection molding so that air is interrupted, but cooling fluid and hydrogen are introduced respectively.

A plurality of sub lines 32b parallelly extend from the main line 30b at a certain intervals as shown in FIG. 1B. Hydrogen introduced from the side of the cooling surface 12 (described later) moves to the reaction surface 10 through the hydrogen passageway 40. A detailed description of flow of cooling water, hydrogen and air in the flow channel and other components of the separator will be omitted herein.

The gasket manufactured by a typical injection molding method has a limited amount of airtightness. These limitations will be described below with reference to FIGS. 2A and 2B. FIG. 2A is a view illustrating the structure of a gasket integrally formed on a typical separator, and FIG. 2B is a cross-sectional view of a mold for manufacturing a gasket formed along line A-A of FIG. 2A.

In FIG. 2A, a gasket indicated by a solid line is a main line 30a and a sub line 32a on the side of the reaction surface, and a gasket indicated by is a main line 30b and a sub line 32b on the side of the cooling surface, i.e., on the opposite surface of the separator. In this case, a region where the reaction surface side gasket 30a and 32a and the cooling surface side gasket 30b and 32b are installed includes regions 50 and 54 where the gasket is disposed on different lines and a region 52 where the gasket is disposed on the same line.

Among the above regions, the region 52 where the gasket is disposed on the same line and a cooling fluid flows in and out is manufactured by an upper gasket mold 60a and a lower gasket mold 60b that are disposed based on the separator as shown in the upper figure of FIG. 2B. Since substantially uniform injection pressures P1 and P2 act on the both molds, any limitation does not occur in gasket injection.

However, the regions 50 and 54 where the gasket is not disposed on the same line and reactant gases flows in and out is manufactured by an upper mold 60a' and a lower mold 60b' that are disposed based on the separator as shown in the lower figure of FIG. 2B. The magnitude of an injection pressure P1' becomes greater than the magnitude of an injection pressure P2' due to an intaglio structure difference between both molds according to the shape of the gasket. Thus, since different injection pressures are locally applied, a pressure applied in the arrow direction as indicated in the lower figured of FIG. 2B causes a minute deformation of the separator and thereby causing the gasket to burr.

The deformation of the separator and the burr of the gasket mean the vicinity of the gate of reactant gases cannot be uniformly compressed upon coupling of a fuel cell stack, and a considerable portion of fuel cell stack may as a result be poorly sealed. Furthermore, the burr generated at the gate region of reactant gases results in the gasket being exposed to a hot and humid environment created by operation of a fuel cell. Since the gasket is formed of a polymer material and is vulnerable to temperature and moisture, the gasket manufactured by a typical method as shown in FIG. 3 may be easily exfoliated and expanded from the surface of the separator. As a result, the flow of reactant gases may be hindered, and the water discharging capacity may be reduced, causing the rapid reduction of the performance and the durability of the fuel cell.

Accordingly, when the gasket is integrally formed on the surface of the metal separator by a typical method, particularly, by injection molding, minute deformations of the separator and burrs in the gasket may occur.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a gasket structure of a fuel cell separator having an improved air tight seal, which can improve the air tight seal of each flow channel without occurrence of minute deformation of the separator and burring of a gasket. The present invention also facilitates flow of fluid in each flow channel, by integrally forming a gasket structure on a portion of the fuel cell separator requiring an air tight seal.

In one aspect, the present invention provides a gasket structure of a fuel cell separator with an improved air tight seal, including: first and second main lines disposed in a horizontal direction of the separator on different lines of a reaction surface and a cooling surface of the separator, respectively; and a plurality of sub lines disposed in a vertical direction of the separator on the both surfaces at a uniform interval. The first and second main lines and the plurality of sub lines integrally form a gate of reactance gases and cooling water, and a plurality of vacant spaces are formed to have a uniform size on the first and second main lines.

In an exemplary embodiment, the vacant spaces may be formed by support pins that are disposed in an upper mold for manufacturing the first main line at a side of the reaction surface and a lower mold for manufacturing the second main line at a side of the cooling surface, respectively.

In another exemplary embodiment, the support pin may be disposed at a region to which a lower one of a first injection pressure applied to the upper mold for manufacturing the first main line at the side of the reaction surface and a second injection pressure applied to the lower mold for manufacturing the second main line at the side of the cooling surface is applied.

In still another exemplary embodiment, the support pin may be disposed at a region in which intaglio structures of the upper mold for manufacturing the first main line at the side of the reaction surface and the lower mold for manufacturing the second main line at the side of the cooling surface are different from each other.

In yet another exemplary embodiment, the vacant spaces may be formed at all cross points of the first and second main lines and the sub lines.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
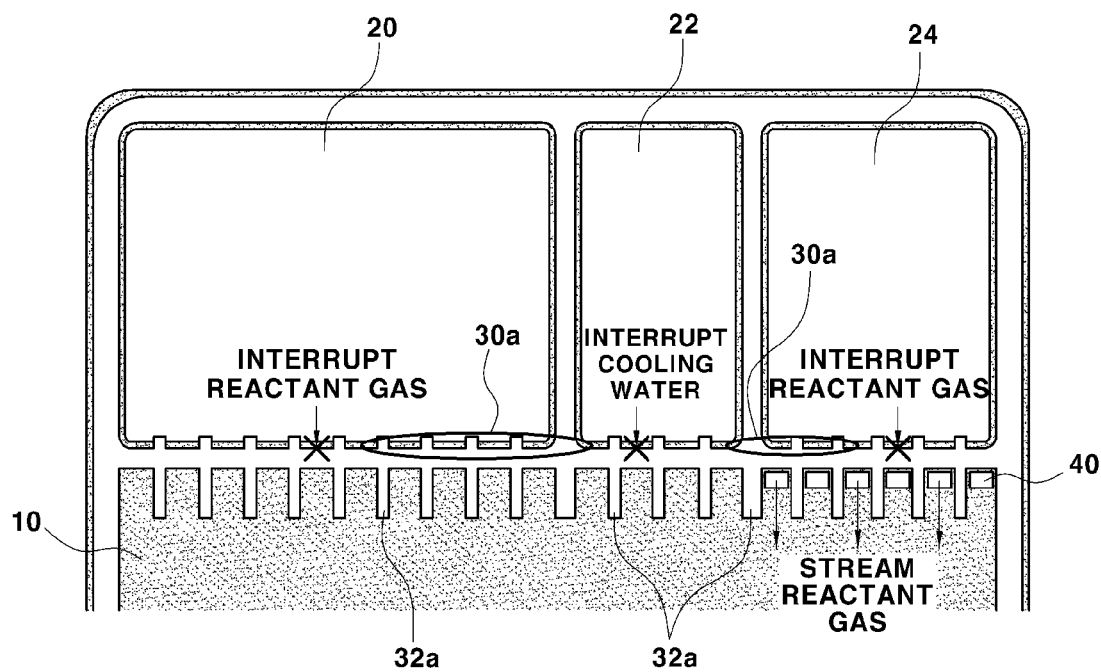
FIG. 1A is a view illustrating the structure of a gasket integrally formed on the side of a reaction surface of a typical separator.
Figure 1B:
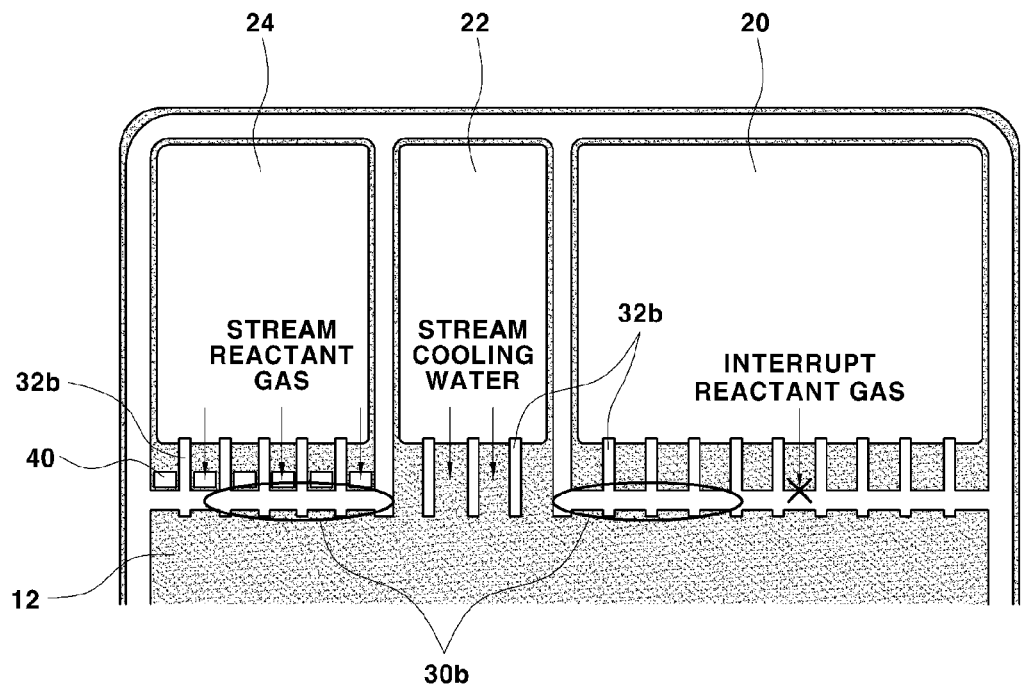
FIG. 1B is a view illustrating the structure of a gasket integrally formed on the side of a cooling surface of a typical separator.

Reference numerals set forth in the Drawings includes reference to the following elements as further discussed below:

110: reaction surface
112: cooling surface
120: air manifold
122: cooling water manifold
124: hydrogen manifold
130a: first main line
130b: second main line
132a: reaction surface-side sub line
132b: cooling surface-side sub line
140: hydrogen passageway
150: air gate region
152: cooling water gate region
154: hydrogen gate region
160a and 160b: upper and lower molds
210: vacant space
220: support pin It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings.

Figure 4A:
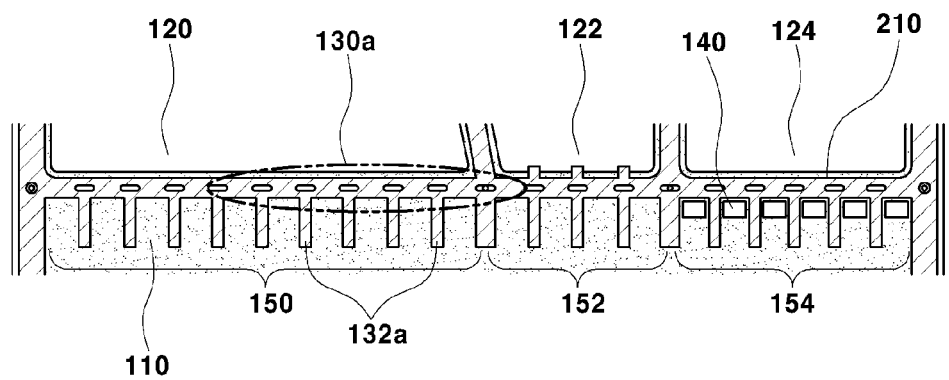
FIGS. 4A and 4B are views illustrating the structure of a gasket of a separator having air tight seal, where the gasket structure integrally formed with a reaction surface of the separator is shown in FIG. 4A and the gasket structure integrally formed with a cooling surface of the separator is shown in FIG. 4B.
Figure 4B:
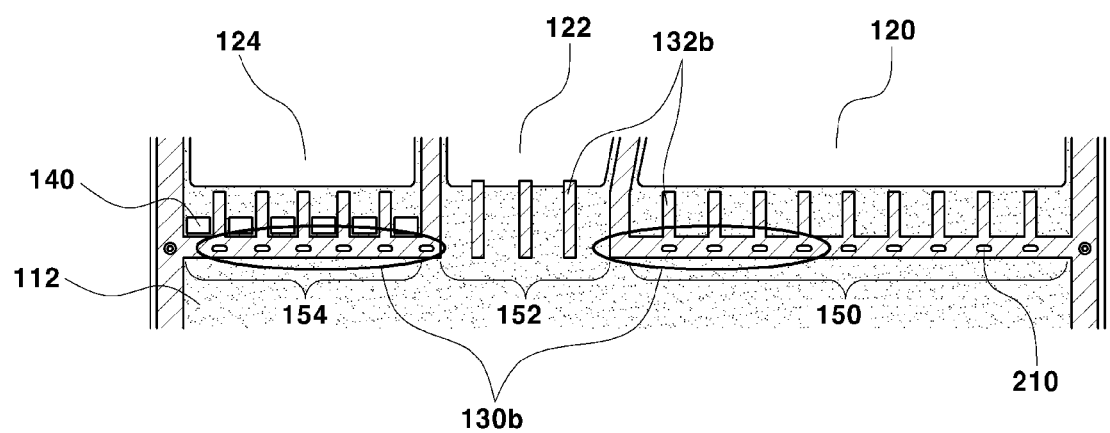
Figure 4C:
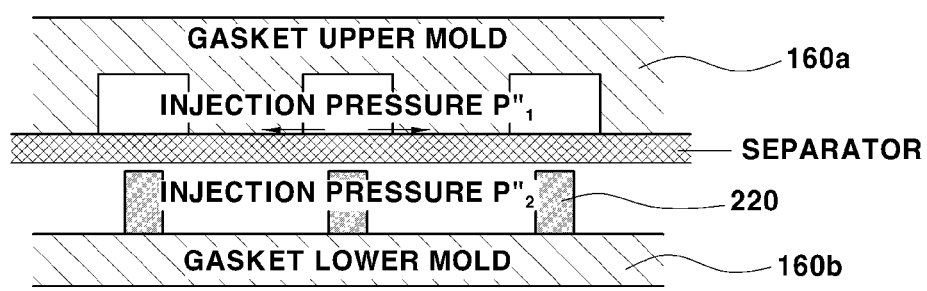
FIG. 4C is a cross-sectional view illustrating a mold for manufacturing the gasket structure of FIGS. 4A and 4B.

FIGS. 4A and 4B are views illustrating the structure of a gasket of a separator having an air tight seal, where the gasket structure integrally formed with a reaction surface of the separator is shown in FIG. 4A and the gasket structure integrally formed with a cooling surface of the separator is shown in FIG. 4B. FIG. 4C is a cross-sectional view illustrating a mold for manufacturing the gasket structure of FIGS. 4A and 4B.

The gasket structure with an improved airtight seal according to an exemplary embodiment of the present invention may include first and second main lines 130a and 130b formed in a horizontal direction of a separator on different lines of a reaction surface 110 and a cooling surface 122 of the fuel cell separator, and a plurality of sub lines 132a and 132b formed at a certain interval in a vertical direction on both surfaces of the separator. The first and second main lines 130a and 130b and the plurality of sub lines 132a and 132b may integrally form a gate for reactant gases and cooling water. A plurality of vacant spaces 210 may be formed on the first and second main lines 130a and 130b.

In the gasket structure integrally formed at the reaction surface 110 and the cooling surface 112 of the separator as shown in FIGS. 4A and 4B, an air manifold 120, a cooling water manifold 122, and a hydrogen manifold 124 may be disposed in parallel on the both surfaces of the separator to have a substantially equal length. Furthermore, hydrogen introduced from the cooling surface 112 to the reaction surface 110 through the hydrogen passageway 140 may move therethrough.

As shown at the side of the reaction surface 110 of FIG. 4A, the first main line 130a may be connected to a side line formed along all corners of the reaction surface 110, and may extend to adjacent regions of the hydrogen manifold 120, the air manifold 124, and the cooling water manifold 122 in a horizontal direction of the separator. Also, a plurality of sub lines 132a may be formed in a vertical direction of the separator at a certain interval, and may extend into the flow channel from the first main line 130a.

As shown on cooling surface side 112 of FIG. 4B, the first main line 130a may be connected to a side line formed along all corners of the reaction surface 110, and may extend to adjacent regions of the hydrogen manifold 120, the air manifold 124, and the cooling water manifold 122 in a horizontal direction of the separator. Also, a plurality of sub lines 132a may be formed in a vertical direction of the separator at a certain interval, and may extend in the opposite direction of a flow channel from the first main line 130a at the gate 150 and 154 of reactant gases. The plurality of sub lines 132a may be separated by the second main line 130a to induce the flow of cooling water at the gate 152.

The gasket structure may form the gate 150 and 154 of reactant gases connected to each flow channel of reactant gases and the gate 152 of cooling water connected to the flow channel of cooling water to introduce and interrupt reactant gases and cooling fluids therethrough. In this case, a plurality of vacant spaces 210 may be formed to have a uniform size on the first and second main lines 130a and 130b.

The vacant space 210 may be formed at all cross points of the first and second main lines 130a and 130b and the plurality of sub lines 132a and 132b, which will be described later. Since the vacant space 210 is formed on the first main line 130a at the side of the reaction surface 110 in a uniform size and simultaneously the second main line 130b on the side of the cooling surface 112, minute deformation of the separator and burring of the gasket are prevented, and the gasket may be formed at a exact location according to a demand of a designer.

Although there are many methods for manufacturing the gasket structure of FIGS. 4A and 4B, an exemplary method for manufacturing a gasket on the both surfaces of the separator through injection molding will be described with reference to FIG. 4C.

When the gasket structure is manufactured by injection molding using a mold, the vacant space 210 may be formed by support pins 220 disposed on an upper mold 160a for manufacturing the first main line 130a on the side of the reaction surface 110 and a lower mold 160b for manufacturing the second main line 130b on the side of the cooling surface 112, respectively.

Particularly, the support pins 220 may be disposed within a region where a lower injection pressure is applied among an injection pressure P1" applied to the upper mold 160a for manufacturing the first main line 130a on the side of the reaction surface 110 and an injection pressure P2" applied to the lower mold 160b for manufacturing the second main line 130b on the side of the cooling surface 112, or may be disposed within a region where the intaglio structures of the upper mold 160a for manufacturing the first main line 130a and the lower mold 160b for manufacturing the second main line 130b are different.

Specifically, in the gasket structure formed on the reaction surface 110 and the cooling surface 112 of the fuel cell separator, the first and second main lines 130a and 130b may be disposed along different lines. Particularly, an intaglio structure difference between both molds may occur according to a variation of the shape of the gasket manufactured on both surfaces within the gate regions 150 and 154 of reactant gases. The gasket structure, however, should not exist within the same line. That is, when the cooling surface and the reaction surface overlap they are referred to as being on the same line. Meanwhile, in local areas of inlet/outlet there is(are) a line(s) that may not overlap with each other and these are referred to not on the same line. The intaglio structure difference may cause a difference between injection pressures applied to both molds. Such differences between injection pressures or the intaglio structures of the molds may minutely deform the separator, and burring of the gasket may occur according to introduction of a gasket material into a deformed gap or space.

Accordingly, the support pin 220 may be disposed in the mold for manufacturing the gasket of the gate regions 150 and 154 of reactant gases where the difference between the injection pressures applied to both molds is easily generated or the intaglio structure difference between the both molds exists. In other words, as shown in FIG. 4C, the support pin 220 may be disposed within a region where the intaglio structures of the both molds are different like the mold shown in the figure of FIG. 2B. Thus, although the gaskets formed at the sides of the reaction surface 110 and the cooling surface 112 of the separator, respectively, are not within the same regions 150 and 154, the gasket may be disposed at an exact location according to design.

Figure 2A:
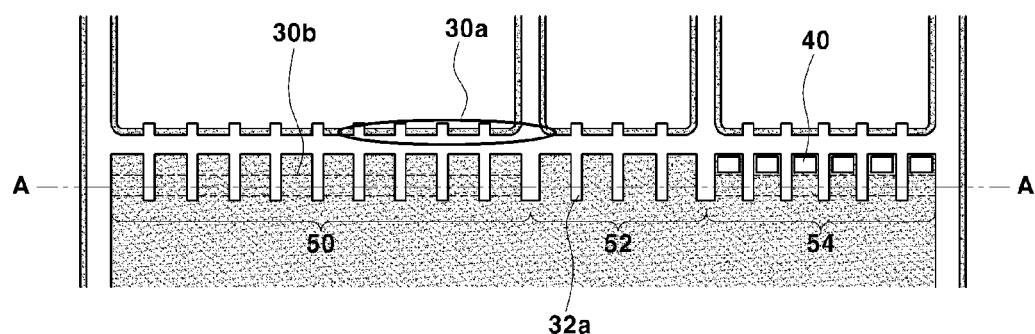
FIG. 2A is a view illustrating the structure of a gasket integrally formed on a typical separator.
Figure 2B:
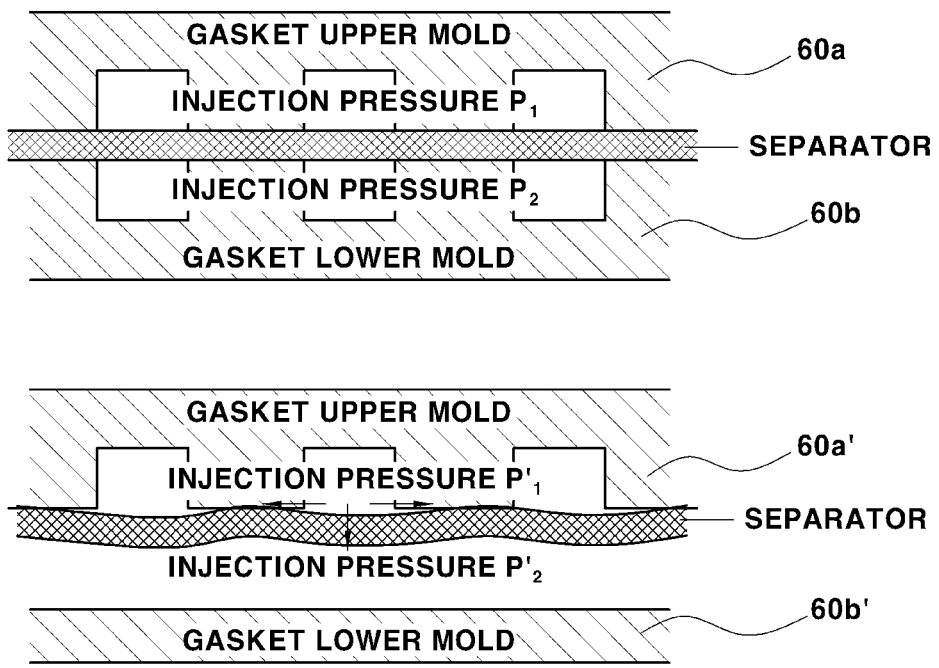
FIG. 2B is a cross-sectional view of a mold for manufacturing a gasket formed along line A-A of FIG. 2A.
Figure 3:
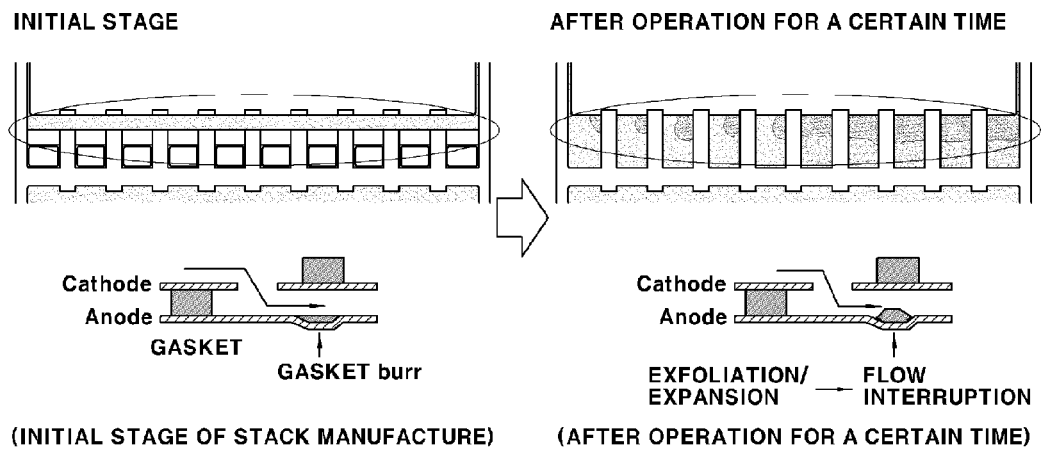
FIG. 3 is a view illustrating a deformation of a gasket manufacture by a typical method.

Also, as shown in FIG. 4C, since the support pin 220 may be disposed within a region where the lower injection pressure P2' among the injection pressures P1' and P2' of the both molds for manufacturing the gasket is applied as shown in the lower figure of FIG. 2B, substantially uniform injection pressures P1" and P2" may be applied to the both molds, thereby prevent deformation of the separator and the burr of the gasket.

The support pin 220 may be disposed in the upper mold 160a and the lower mold 160b like in FIG. 4A, and may be disposed in the both molds when the injection pressure difference needs to be controlled. The support pin 220 may be integrated into the intaglio structure of the upper mold 160a and the lower mold 160b, or may be detachably formed.

In addition, under an injection molding method according to an exemplary embodiment of the present invention, a plurality of vacant spaces 210 formed by a plurality of support pins 220, as shown in FIGS. 4A and 4B, may be formed to have an uniform size at all cross points of the first and second main lines 130a and the 130b and the plurality of sub lines 132a and 132b, which will be described later.

Thus, in the gasket structure of the separator with an improved air tight seal, since the plurality of vacant spaces are formed to have a uniform size at a portion of the first and second main lines where an airtight seal is needed, a gasket for a separator having excellent air tight seal and injection performances can be manufactured, and the gasket lines can be formed in a desired shape at a desired location by a designer. Also, the burr of the gasket and the minute deformation of the separator can be prevented.

In regard to a desired location of the vacant space formed on the first and second main lines, comparative description of a typical method and a test example will be made with reference to FIGS. 5A through 7.

Figure 5A:
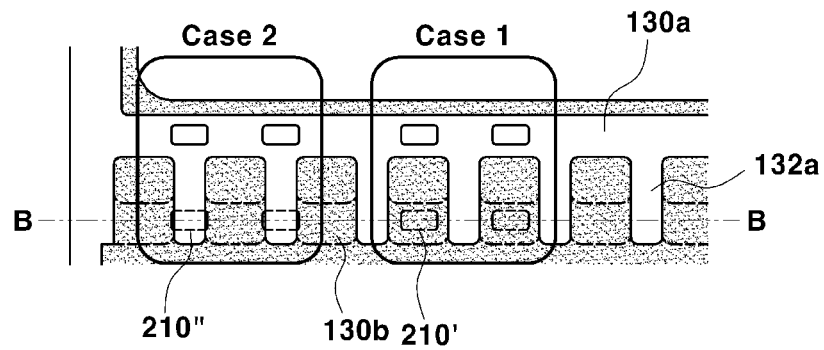
FIG. 5A is a view illustrating the structure of a gasket formed in a test example for comparing the performance of the gasket according to the location of a vacant space in the gasket structure of a separator with an improved air tight seal according to an exemplary embodiment of the present invention.
Figure 5B:
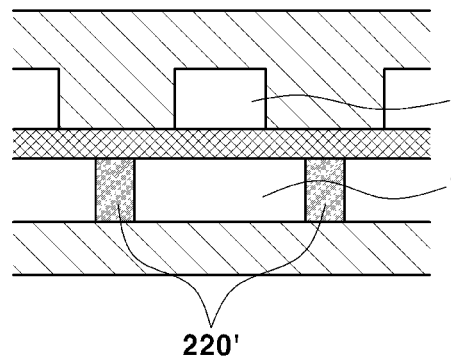
FIG. 5B is a cross-sectional view illustrating a mold for manufacturing a gasket structure formed in each test example along line B-B of FIG. 5A.
Figure 5B:
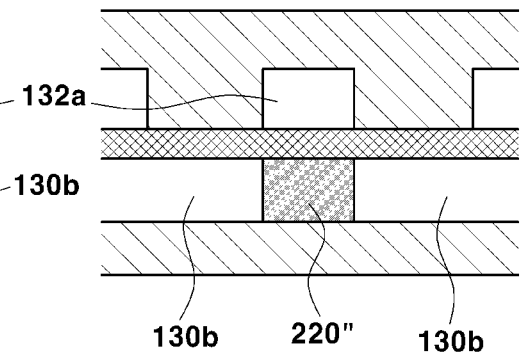

FIG. 5A is a view illustrating the structure of a gasket formed in a test example for comparing the performance of the gasket according to the location of a vacant space in the gasket structure of a separator with an improved air tight seal according to an embodiment of the present invention. FIG. 5B is a cross-sectional view illustrating a mold for manufacturing a gasket structure formed in each test example along line B-B of FIG. 5A.

As shown in FIG. 5A, in the first test example, a gasket structure in which vacant spaces 210' are formed between cross points formed by the first and second main lines 130a and 130b and the plurality of sub lines 132a (e.g., cooling surface side is not shown) and other cross points is used. As shown in FIG. 5B, the support pin 220' may be disposed on the lower mold so that the vacant spaces 210' are formed to manufacture the gasket structure through injection molding. Also, in the second test example, a gasket structure in which vacant spaces 210" are formed between cross points formed by the first and second main lines 130a and 130b and the plurality of sub lines 132a (cooling surface side is not shown) is used. The support pin 220" may be disposed so that the vacant spaces 210" are formed to manufacture the gasket structure through injection molding.

Specifically, looking at the section of line B-B of FIG. 5A, the plurality of sub lines 132a may be injection-molded by the intaglio structure of the upper mold of FIG. 5B at the side of the reaction surface, and the second main line 130b having the plurality of vacant spaces 210' and 210" with a uniform size may be injection-molded through the support pins 220' and 220" and a flat plate structure provided on the lower mold of FIG. 5B.

Thus, the separator having the gasket manufactured by the first and second test examples can be obtained as shown in FIG. 6.

Figure 6A:
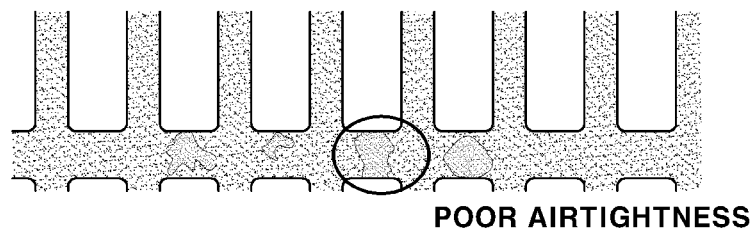
FIGS. 6A-C are views illustrating a portion of a separator with a gasket manufactured by a typical method and a portion of a separator with a gasket manufactured using a mold of each test example of FIG. 5B.
Figure 6B:
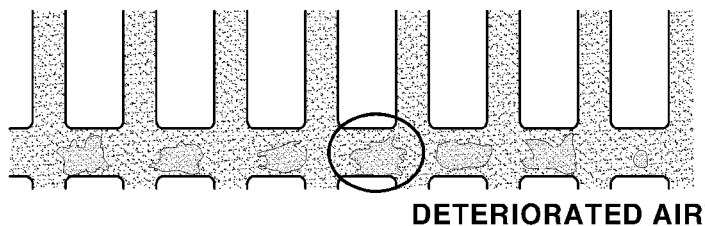

In the case of a separator of FIG. 6A, formed via a typical method in which the gasket structure manufactured by a simple mold without a support pin structure is integrally formed, since a surface pressure may be concentrated within the vicinity of the cross point of the main line and the sub line, an air tight seal between one cross point and another cross point may be relatively reduced. Thus, it can be understood that the cross point largely gains strain per unit area of the gasket and is exposed to a large force and pressure In the case of a separator of FIG. 6B having is a gasket structure integrally formed in a first test example. Although a vacant space is formed between one cross point and another cross point by the main line and the sub line, a deteriorated result is shown in terms of an air tight seal.

Figure 6C:
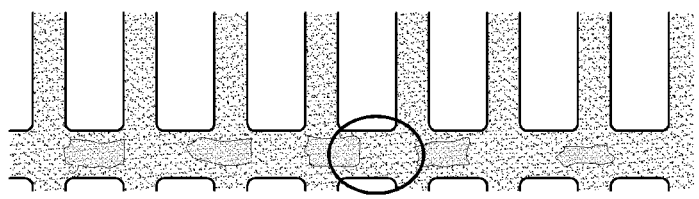
Figure 7:
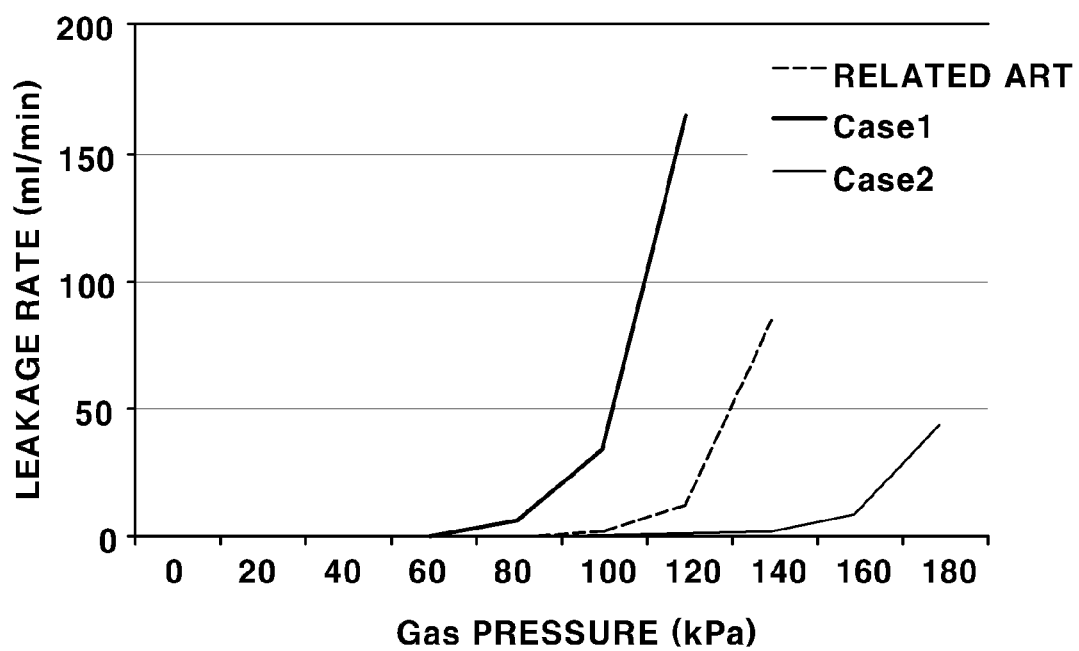
FIG. 7 is a graph illustrating the leakage rate according to the gas pressure in reactant gas flow channels of separators with gaskets shown in FIG. 6.

In the case of a separator of FIG. 6C, having a gasket structure integrally formed in the second test example, since a vacant space may be formed at a cross point by the main line and the sub line, strain per unit area can be reduced, and an air tight seal can be significantly improved compared to the typical method or the first test example in FIGS. 6A and B, The above result are verified in a graphical representation showing a leakage rate according to the gas pressure in reactant gas flow channels of separators with the gaskets of FIG. 6. The graph of FIG. 7 shows the leakage rate in the reactant gas flow channel of the above three cases while applying nitrogen or helium. As can be seen in FIG. 6, in the case of the first test example, gas was more easily leaked even at a lower pressure than that in the typical method. In the case of the second test example, however, the air tight seal could be maintained at a higher pressure than that in the typical method.

Based on the above result, it can be seen that more desirable to form a plurality of vacant spaces at all cross points of the first and second main lines and the plurality of sub lines. Portions of gasket burring may occur in the separator having the gasket according to the typical method, particularly, around the gate of reactant gases, whereas gasket burring does not occur in the separator having the gasket according to the second test example, and an excellent air tight seal is achieved. Also, injection may be performed in a desired shape at a desired location by a designer.

Accordingly, in the gasket structure of the separator with an improved air tight seal according to the embodiment of the present invention, since vacant spaces can be formed on the first and second main lines, particularly, at all cross points of the first and second mainlines and the plurality of sub lines, defect of the air tight seal due to the gasket burring can be significantly reduced. Also, when the gasket is manufactured via injection molding, injection performance can increase, thereby improving the overall performance and durability of a fuel cell.

According to embodiments of the present invention, in a gasket structure of a separator with an improved air tight seal, a plurality of vacant spaces are formed to have a uniform size on first and second main lines integrally formed on a reaction surface and a cooling surface, respectively, and a gasket can be formed in a desired shape at a desired location based on design without minute deformation or gasket burring of the separator. Furthermore, a fuel cell including the separator with the gasket structure can be improved overall in performance and durability.

Also, when the gasket is integrally formed on both surfaces of the separator through injection molding using a mold, injection defect or gasket burring caused by a difference between intaglio structures of molds or a difference between applied injection pressures can be overcome by a support pin, thereby enabling the manufacture of the gasket of the separator with an improved air tight seal.

In addition, even after long term use, since the gasket with an improved air tight seal and injection performance is not exfoliated or expanded from the separator, the lifespan of the gasket can be increased, and thus the illustrative embodiment of the present invention is more cost effective as well.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A gasket structure of a fuel cell separator with an improved air tight seal, comprising:
    a plurality of first and second main lines disposed in a horizontal direction of the fuel cell separator along different lines of a reaction surface and a cooling surface of the fuel cell separator, respectively; and
    a plurality of sub lines disposed in a vertical direction of the separator on both surfaces thereof at a uniform interval,
    wherein the first and second main lines and the plurality of sub lines integrally form a gate for reactance gases and cooling water, and a plurality of vacant spaces are formed to have a uniform size on the plurality of first and second main lines,
    wherein the vacant spaces are formed only at all cross points of the first and second main lines and the sub lines, and
    wherein the vacant spaces are formed at uniform intervals corresponding to the sub lines.

2. The gasket structure of claim 1, wherein the vacant spaces are formed by support pins that are disposed in an upper mold for manufacturing the first main line at a side of the reaction surface and a lower mold for manufacturing the second main line at a side of the cooling surface, respectively.

3. The gasket structure of claim 2, wherein the support pin is disposed within a region to which a lower one of a first injection pressure applied to the upper mold for manufacturing the first main line at the side of the reaction surface and a second injection pressure applied to the lower mold for manufacturing the second main line at the side of the cooling surface is applied.

4. The gasket structure of claim 2, wherein the support pin is disposed within a region in which intaglio structures of the upper mold for manufacturing the first main line at the side of the reaction surface and the lower mold for manufacturing the second main line at the side of the cooling surface are different from each other.

5. A separator for a fuel cell, comprising:
    a gasket including:
        a plurality of first and second main lines formed along a horizontal direction of a separator along different lines of a reaction surface and a cooling surface of the separator, respectively; and
        a plurality of sub lines formed along a vertical direction of the separator on both surfaces thereof at uniform intervals,
        a plurality of vacant spaces formed to have a uniform size on the plurality of first and second main lines,
        wherein the vacant spaces are formed only at all cross points of the first and second main lines and the sub lines, and
        wherein the vacant spaces are formed at uniform intervals corresponding to the sub lines.

6. The separator of claim 5, wherein the vacant spaces are formed by support pins that are disposed in an upper mold for manufacturing the first main line at a side of the reaction surface and a lower mold for manufacturing the second main line at a side of the cooling surface, respectively.

7. The separator of claim 6, wherein the support pin is disposed within a region to which a lower one of a first injection pressure applied to the upper mold for manufacturing the first main line at the side of the reaction surface and a second injection pressure applied to the lower mold for manufacturing the second main line at the side of the cooling surface is applied.

8. The gasket structure of claim 6, wherein the support pin is disposed within a region in which intaglio structures of the upper mold for manufacturing the first main line at the side of the reaction surface and the lower mold for manufacturing the second main line at the side of the cooling surface are different from each other.

\* \* \* \* \*